(12) United States Patent
Miyatani et al.

(10) Patent No.: US 12,207,006 B2
(45) Date of Patent: Jan. 21, 2025

(54) SOLID-STATE IMAGING DEVICE AND ELECTRONIC APPARATUS

(71) Applicant: Sony Semiconductor Solutions Corporation, Kanagawa (JP)

(72) Inventors: Yoshitaka Miyatani, Tokyo (JP); Shinichiro Noudo, Kumamoto (JP); Masashi Nakata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 143 days.

(21) Appl. No.: 18/044,520

(22) PCT Filed: Sep. 1, 2021

(86) PCT No.: PCT/JP2021/032044
§ 371 (c)(1),
(2) Date: Mar. 8, 2023

(87) PCT Pub. No.: WO2022/059481
PCT Pub. Date: Mar. 24, 2022

(65) Prior Publication Data
US 2023/0336883 A1    Oct. 19, 2023

(30) Foreign Application Priority Data

Sep. 15, 2020   (JP) .................................. 2020-154837

(51) Int. Cl.
*H04N 25/47*    (2023.01)
*G06V 40/13*    (2022.01)
*G06V 40/145*   (2022.01)

(52) U.S. Cl.
CPC ............. *H04N 25/47* (2023.01); *G06V 40/13* (2022.01); *G06V 40/145* (2022.01)

(58) Field of Classification Search
CPC .. G06V 40/13; G06V 40/145; G06V 40/1341; G06V 10/141; G06V 10/25; H04N 25/47
(Continued)

(56) References Cited

U.S. PATENT DOCUMENTS 6,459,804 B2 * 10/2002 Mainguet ........... G06V 40/1306
382/284
8,311,514 B2 * 11/2012 Bandyopadhyay ... G06F 1/1684
455/418
(Continued)

FOREIGN PATENT DOCUMENTS

JP   2009277054 A   11/2009
JP   2018186478 A   11/2018
(Continued)

OTHER PUBLICATIONS

International Search Report (PCT/ISA/210), International Application No. PCT/JP2021/032044, dated Nov. 22, 2021.

*Primary Examiner* — Pritham D Prabhakher
(74) *Attorney, Agent, or Firm* — Michael Best & Friedrich LLP (57) ABSTRACT

The present invention relates to a solid-state imaging device capable of highly accurate authentication.
The solid-state imaging device includes a light receiving unit and a control unit. The light receiving unit includes event-driven pixels that output the occurrence of an event on the basis of a threshold. The control unit is a control unit that controls the light receiving unit, and is configured to set a first threshold for the event-driven pixels, and, in a case where an event based on the first threshold has been detected, set a second threshold smaller than the first threshold for the event-driven pixels.

15 Claims, 9 Drawing Sheets

(58) Field of Classification Search
USPC .................................................... 348/222.1
See application file for complete search history.

(56) References Cited

U.S. PATENT DOCUMENTS

| | | | | |
|---|---|---|---|---|
| 9,405,415 | B2* | 8/2016 | Morein | G06F 3/041662 |
| 10,102,411 | B2* | 10/2018 | Lillie | G06V 40/1306 |
| 10,872,220 | B2* | 12/2020 | Cho | G06V 40/63 |
| 11,234,647 | B2* | 2/2022 | Kang | A61B 5/0077 |
| 11,320,693 | B2* | 5/2022 | He | G06F 3/0412 |
| 11,381,676 | B2* | 7/2022 | Arellano | G06F 3/0484 |
| 11,786,180 | B2* | 10/2023 | Kang | A61B 5/7485 |
| | | | | 600/301 |
| 2014/0267659 | A1* | 9/2014 | Lyon | G06V 10/98 |
| | | | | 348/77 |
| 2015/0062078 | A1* | 3/2015 | Christman | A61B 5/6897 |
| | | | | 345/174 |
| 2016/0092717 | A1* | 3/2016 | Ling | G06V 40/1318 |
| | | | | 345/173 |
| 2016/0246396 | A1* | 8/2016 | Dickinson | G06F 3/043 |
| 2017/0095168 | A1* | 4/2017 | Kwon | A61B 5/1172 |
| 2017/0119307 | A1* | 5/2017 | Shim | A61B 5/7475 |
| 2018/0211078 | A1* | 7/2018 | Lillie | G06V 40/1306 |
| 2018/0211090 | A1* | 7/2018 | Yang | G06V 40/67 |
| 2018/0300526 | A1* | 10/2018 | Cho | G06F 3/042 |
| 2020/0037956 | A1* | 2/2020 | Kang | A61B 5/0077 |
| 2021/0022677 | A1* | 1/2021 | Kang | A61B 5/02225 |
| 2021/0063816 | A1* | 3/2021 | He | G02F 1/133615 |
| 2021/0174105 | A1* | 6/2021 | He | G06V 10/141 |

FOREIGN PATENT DOCUMENTS

| | | |
|---|---|---|
| JP | 2019134271 A | 8/2019 |
| JP | 2020088480 A | 6/2020 |
| WO | 2018012492 A1 | 1/2018 |
| WO | 2019135411 A1 | 7/2019 |

* cited by examiner

SOLID-STATE IMAGING DEVICE AND ELECTRONIC APPARATUS

TECHNICAL FIELD

The present disclosure relates to a solid-state imaging device and an electronic apparatus.

BACKGROUND ART

Nowadays, fingerprint authentication is used in various scenes in electronic apparatuses. This fingerprint sensor acquires fingerprint information by means of a light receiving element and thereby implements authentication. For example, a CMOS sensor is used in the acquisition of the fingerprint information.

However, in a case where a CMOS sensor is used as the fingerprint sensor, the performance in a dark place, the narrowness of a dynamic range, which is likely to be affected by light from the outside, and the light receiving performance on a moving object, etc. have significant influence, and these need to be dealt with.

CITATION LIST

Patent Documents

Patent Document 1: Japanese Patent Application Laid-Open No. 2009-277054
Patent Document 2: International Publication No. WO 2018/012492.

SUMMARY OF THE INVENTION

Problems to be Solved by the Invention

In an embodiment of the present disclosure, there are provided a solid-state imaging device and an electronic apparatus that are capable of highly accurate authentication.

Solutions to Problems

According to an embodiment, a solid-state imaging device includes a light receiving unit and a control unit. The light receiving unit includes event-driven pixels that output the occurrence of an event on the basis of a threshold. The control unit is a control unit that controls the light receiving unit, and is configured to set a first threshold for the event-driven pixels, and, in a case where an event based on the first threshold has been detected, set a second threshold smaller than the first threshold for the event-driven pixels.

In the case where an event based on the first threshold has been detected, the control unit may further set a region of interest (ROI) in the light receiving unit; the event-driven pixels detect an event in the ROI.

The solid-state imaging device may further include a signal processing unit configured to process signals that the event-driven pixels have output.

The signal processing unit may generate an authentication image by time-integrating the signals that the event-driven pixels have output.

The solid-state imaging device may further include an authentication unit configured to perform authentication using the authentication image based on the signals that the event-driven pixels have output.

The authentication image may be a fingerprint image.
The authentication image may be a vein image.

The solid-state imaging device may further include an optical system configured to cause each of the event-driven pixels belonging to the light receiving unit to receive light.

The optical system may include a pinhole array.
The optical system may include a microlens array.

The authentication image may be a fingerprint image and a vein image, and the event-driven pixels may include pixels that acquire the fingerprint image and pixels that acquire the vein image.

The pixels that acquire the fingerprint image and the pixels that acquire the vein image may be arranged in a checkered pattern.

The optical system may adjust focal position for the pixels that acquire the fingerprint image and a focal position for the pixels that acquire the vein image to be different positions.

An electronic apparatus may include the solid-state imaging device according to any of those described above.

The electronic apparatus may further include a light-emitting unit configured to output a projected image, and the light receiving unit may be provided farther than the light-emitting unit with respect to an object.

MODES FOR CARRYING OUT THE INVENTION

Embodiments, in the present disclosure will be described below with reference to drawings. The drawings are used for description; the shape, the size or the ratio of the size to another component, etc. of a component of each unit in an actual device do not necessarily have to be as shown in the drawings. Furthermore, the drawings are depicted in a simplified manner; thus, besides those depicted in the drawings, components required to be mounted shall be appropriately included in the unit.

Figure 1:
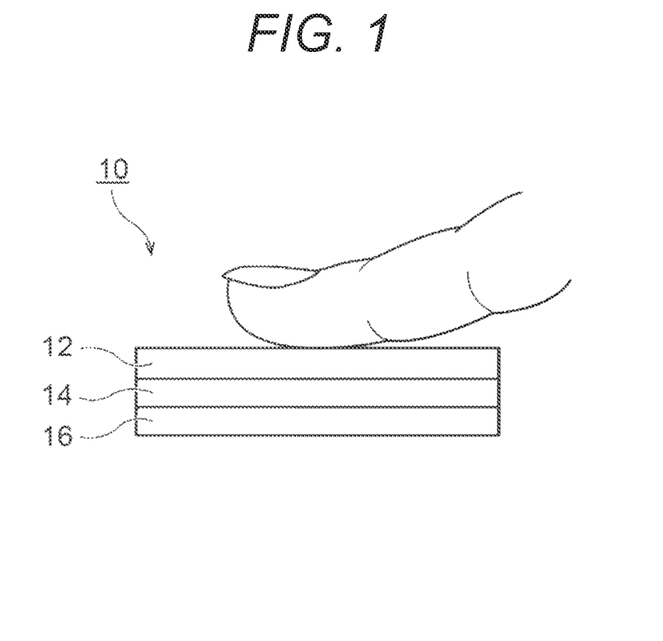
FIG. 1 is a diagram schematically showing an example of a solid-state imaging device according to an embodiment.

FIG. 1 is a diagram schematically showing an example of a module that acquires an image or the like in a case where an authentication device including an imaging device according to an embodiment is used as a fingerprint authentication sensor. An authentication device 10 includes, as an information acquiring section, a cover glass 12, optical system 14, and a light receiving unit 16.

A user puts his/her finger on the cover glass 12 of the authentication device 10, hereby fingerprint is recognized and an electronic apparatus acquires biometric data for authentication of access to various areas or the like.

The cover glass 12 is placed on top of the light receiving unit of the authentication device 10. The authentication device 10 acquires data for a variety or authentication, such as fingerprint authentication, on the basis of conditions of a portion of the cover glass 12 in contact with the finger.

The optical system 14 is placed to let light incident from the cover glass 12 appropriately enter light receiving pixels included in the light receiving unit 16. The optical system 14 may include a pinhole or a lens as an example.

The light receiving unit 16 includes a light receiving element, and light enters the light receiving unit 16 through the cover glass 12 and the optical system 14. The light receiving unit 16 includes event-driven pixels as light receiving elements. The event-driven pixels are provided as sensors that asynchronously detect a change in the luminance of incident light and output, as event data, the coordinates and the time. By using the event-driven pixels, it becomes possible to acquire information with high speed, low latency, and high efficiency.

When having detected a luminance change, the event-driven pixels output the address of the pixel that has had the luminance change, the time when the change has occurred, and the polarity of the luminance change. This output is performed asynchronously as described above; therefore, information regarding how a detection target has moved can be acquired by integrating outputs from the event-driven pixels in a time direction.

As a result, for example, in a case where the event-driven pixels have acquired fingerprint information, by time-integrating the fingerprint information (for example, an image or a projected image), fingerprint information can be acquired. As will be described later, acquired information is not limited to fingerprint information; the event-driven pixels may acquire other information such as vein information that can be used for authentication.

By using the event-driven pixels, it becomes possible to accurately acquire information of a fingerprint or the like even in the performance in a dark place, i.e., in a case where the finger is put so as to cover the pixels that authenticate. Meanwhile, if the sensitivity in the dark place is excessively enhanced, there is a possibility of generating many noises. In the present embodiment, thresholds are set at two stages, thereby authentication with noise immunity to the performance in a dark place is implemented with respect to a moving finger.

Figure 2:
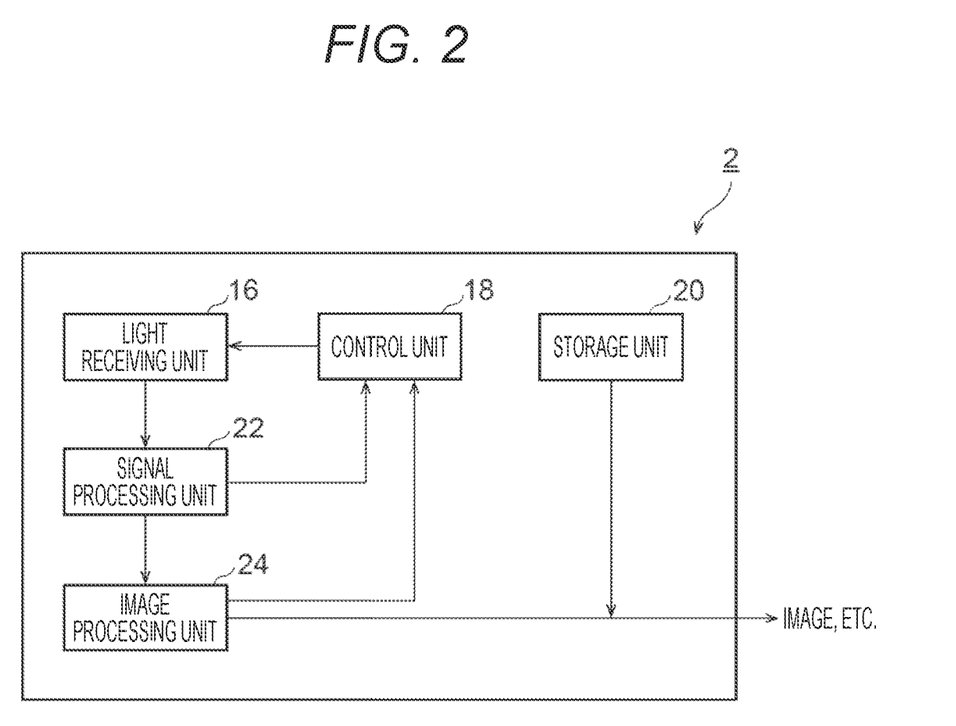
FIG. 2 is a diagram showing a position example of a block diagram of the solid-state imaging device according to the embodiment.

FIG. 2 is a block diagram showing a configuration of a solid-state imaging device 2 according to the embodiment. The sold-state imaging device 2 includes the light receiving unit 16, a control unit 18, a storage unit 20, a signal processing unit 22, an image processing unit 24, and an authentication unit 26. Respective configurations are similar to those of the later-described authentication device 10 and therefore will be described later. The solid-state imaging device 2 performs signal processing and image processing on the basis of received light data, and outputs acquired image data.

Figure 3:
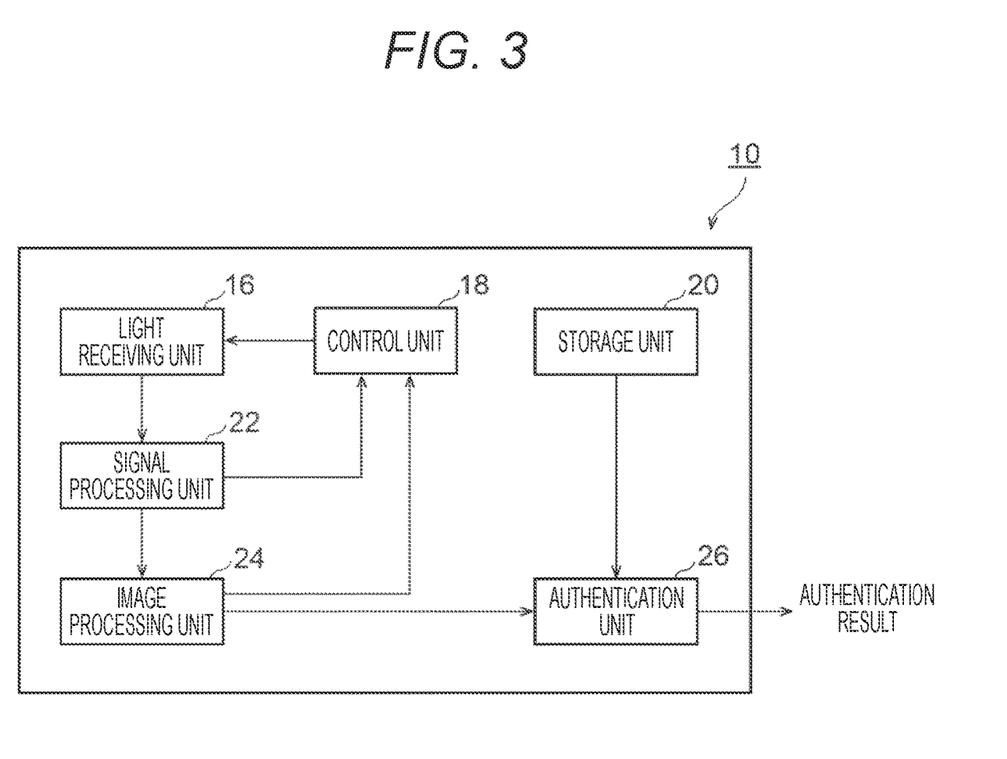
FIG. 3 is a diagram showing an example of a block diagram of an authentication device according to the embodiment.

FIG. 3 is a block diagram showing a configuration of the authentication device 10 according to the embodiment. The authentication device 10 includes, at components that process various signals, etc., the light receiving unit 16, the control unit 18, the storage unit 20, the signal processing unit 22, the image processing unit 24, and the authentication unit 26. That is, the authentication device 10 includes the solid-state imaging device 2 shown in FIG. 2 as part of its configuration.

The light receiving unit 16 is the one described above, and includes the event-driven pixels.

The control unit 18 controls the light receiving unit 16 on the basis of information from the signal processing unit 22 or the image processing unit 24. For example, with respect to each of the event-driven pixels of the light receiving unit 16, the control unit 18 sets a threshold, and further sets a region of interest (ROI).

In a case where a threshold is set, there is a change in the intensity of received light that exceeds the threshold, the event-driven pixel detects the occurrence of an event and outputs a signal. Furthermore, in a case where an ROI is set, the light receiving unit 16 controls to cause event-driven pixels belonging to the ROI to detect the intensity of received light. In this way, the control unit 18 controls the behavior of the event-driven pixels in the light receiving unit 16.

The storage unit 20 stores therein data, etc. required for a variety of processing. For example, data required for personal authentication is stored. Furthermore, in a case where information processing by software is specifically implemented by means of a hardware resource, the authentication device 10 may store therein a program or the like relating to the software. In some cases, it may be configured that the storage unit 20 is provided outside the authentication device 10, i.e., is not included in the authentication device 10.

The signal processing unit 22 performs predetermined signal processing on a signal that the light receiving unit 16 outputs. For example, the signal processing unit 22 performs signal processing on an output of the light receiving unit 16, thereby converting it into image information or the like of an object whose motion has been detected and outputting the image information or the like.

The image processing unit 24 performs predetermined image processing on the image information converted by the signal processing unit 22. The image processing unit 24 performs, for example, a denoising process, various filtering processes, etc. to process the image information into data suitable for the authentication unit 26 to perform authentication of a fingerprint or something.

The signal processing unit 22 and the image processing unit 24 may convert asynchronous information acquired by the light receiving unit 16 into synchronized data. For example, the signal processing unit 22 may receive an asynchronous signal output from the light receiving unit 16 and acquire image information on the basis of this asynchronous signal. Furthermore, as another example, the signal processing unit 22 may sequentially output asynchronous signals to the image processing unit 24, and the image processing unit 24 may acquire a time integrated image suitable for authentication.

The signal processing unit 22 and the image processing unit 24 are described as separate units for the sake of convenience; however, they may be provided as one signal processing unit. As another example, it may include not two units (circuits) but more finely divided units (circuits) for each processing. The signal processing unit 22 and/or the image processing unit 24 generate an authentication image based on signals output from the event-driven pixels.

The authentication unit 26 performs authentication on the basis of the image information (the authentication image) output by the image processing unit 24 and authentication information stored in the storage unit 20. As described above, for example, the image processing unit 24 time-integrates acquired information, thereby outputting an image. In this case, the authentication unit 26 performs authentication by comparing this image with the authentication information stored in the storage unit 20. The authentication unit 26 performs the authentication by any impression method, such as authentication using, for example, feature-point extraction or a neural network model.

The authentication unit 26 outputs a result of this authentication to the outside. Another externally provided electronic apparatus performs processing or permits processing on the basis of this authentication result. In this way, the authentication device 10 implements personal authentication on the basis of the image acquired by means of the event-driven pixels.

Some or all of the respective units of the authentication device 10 described above may be each implemented by a dedicated digital circuit or analog circuit. In a case of a dedicated circuit, it may include, for example, an application specific integrated circuit (ASIC) or a field programmable gate array (FPGA). Furthermore, it may be implemented by a general-purpose processing circuit such as a central processing unit (CPU).

Moreover, in the above description, the authentication device 10 is made up including the solid-state imaging device 2 and the authentication unit 26; however, it is not limited to this configuration. For example, a configuration in which the solid-state imaging device 2 is provided with the authentication unit 26 may be referred to as a solid-state imaging device.

Figure 4:
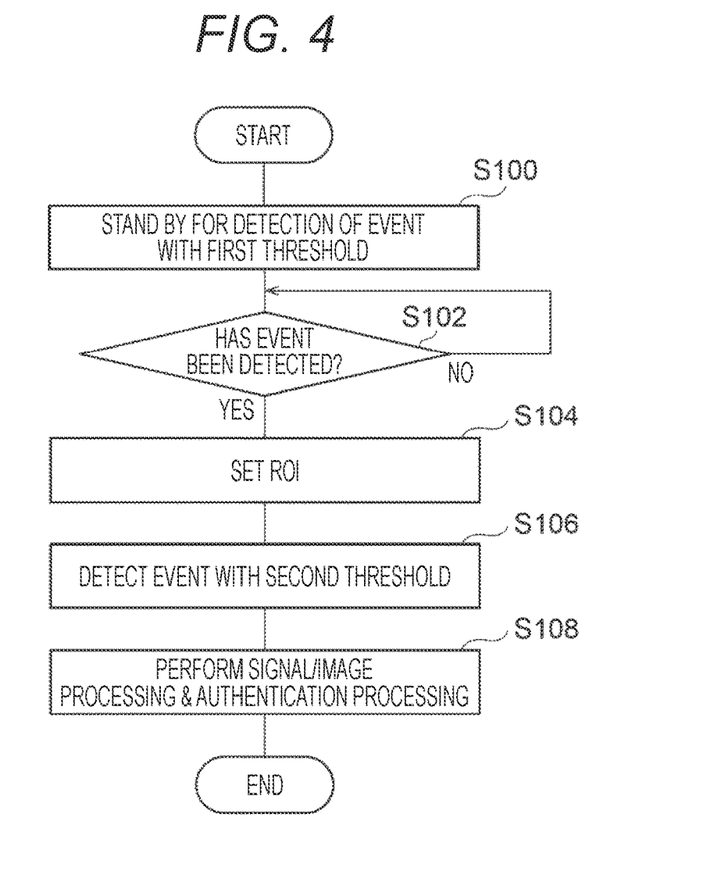
FIG. 4 is a flowchart showing a process performed by the authentication device according to the embodiment.

FIG. 4 is a flowchart showing a process performed by the authentication device 10. Subsequently, the process performed by the authentication device 10 is described with this FIG. 4.

First, the event-driven pixels of the light receiving unit 16 are set up with a first threshold, and are in a standby state in which the light receiving unit 16 detects an event (S100). The setting of this first threshold may be controlled by the control unit 18. For example, this first threshold is a threshold for detecting the state in which the finger has been put on the cover glass 12. That is, is a threshold for detecting such a significant change (a high-contrast change) that light is blocked by the finger having been put or something in a state where ambient light is received.

Next, the light receiving unit 16 detects whether or not an event has been detected in the above-described standby state (S102). Until an event has been detected (S102: NO), the above-described event standby state is maintained.

When an event has been detected (S102: YES), next, the control unit 18 sets an ROI (S104). When the ROI has been set, the process moves on to detection by the light receiving unit 16 using event-driven pixels belonging to the ROI. In other words, event-driven pixels not belonging to the ROI do not perform the detection of an event. In this way, it changes to a mode in which an event is detected from the pixels within the ROI.

For example, the control unit 18 may set the ROI in a predetermined range. By determining the range in which the ROI is set in advance in this way, the user can move the finger or something to perform authentication in a place of the ROI. For example, this place may be appropriately marked on the cover glass 12.

As another example, the control unit 18 may determine in which of the pixels of the light receiving unit 16 an event has occurred and set an ROI within an appropriate range on the basis of the position of this pixel. By setting the ROI on the basis of the position at which the event has been detected in this way, the user may move the finger or something to any position in a range in which the light receiving unit 16 exists when performing authentication.

In parallel with the setting of this ROI, the event-driven pixels of the light receiving unit 16 are set up with a second threshold, and fall into a standby state in which an event is detected in the light receiving unit 16, more precisely, the event-driven pixels within the ROI of the light receiving unit 16 (S106). The setting of this second threshold may also be controlled by the control unit 18. This second threshold is a threshold of which the value is smaller than at least the first threshold. By detecting an event with the second threshold smaller than the first threshold, the occurrence of an event is detected in pixels having a smaller luminance change (a low-contrast change). It is noted that these steps may be performed in reverse order.

Then, on the basis of the signals acquired by the light receiving unit 16 through the performance of the control using the second threshold, the signal processing unit 22 and the image processing unit 24 perform the appropriate signal processing and image processing, and the authentication unit 26 performs authentication using data on which this appropriate processing has been performed (S108).

For example, by changing from the first threshold to the second threshold, the probability of occurrence of a noise event within the ROI is increased. Accordingly, the signal processing unit 22 or the image processing unit 24 sets an appropriate integration time so that an object of authentication and noise can be distinguished.

Each of the above steps will be described with reference to the drawings. In the drawings described below, a filled inner area indicates pixels in an event detecting (event-driven) state, and a shaded area indicates pixels in a state where the event-driven is off. Furthermore, the authentication device 10 is described to acquire an image for fingerprint authentication; however, it can be similarly applied to a case of acquiring other information.

Figure 5:
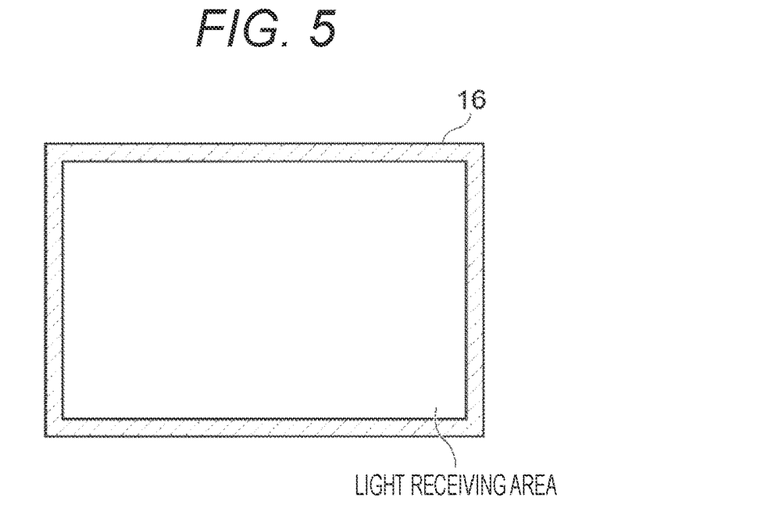
FIG. 5 is a diagram showing an appearance of a light receiving unit according to the embodiment.

FIG. 5 is a diagram showing the standby state in the above-described S100. The event-driven pixels included in a light receiving area of the light receiving unit 16 stand by for detection of an event with the first threshold. For example, they are maintained in a state of standing by for an object of some sort (such as the finger) being put on the light receiving area. In this state, as described above, a high-contrast event is detected.

Figure 6:
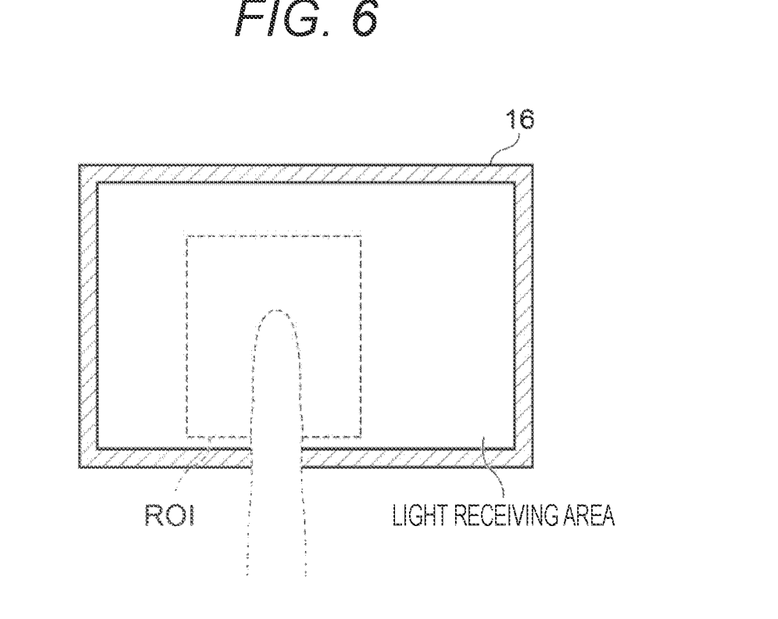
FIG. 6 is a diagram showing the appearance of the light receiving unit according to the embodiment.

FIG. 6 is a diagram showing the ROI in S104. A dotted line indicates the user's finger, and shows the situation in which an event has been detected with the first threshold. A broken line indicates the set ROI. In this way, as an example, the ROI in which fingerprint information can be appropriately acquired is set in the area in which the finger has been detected. As described above, it is also possible to automatically set a predetermined area set in advance as the ROI when an event has been detected.

Figure 7:
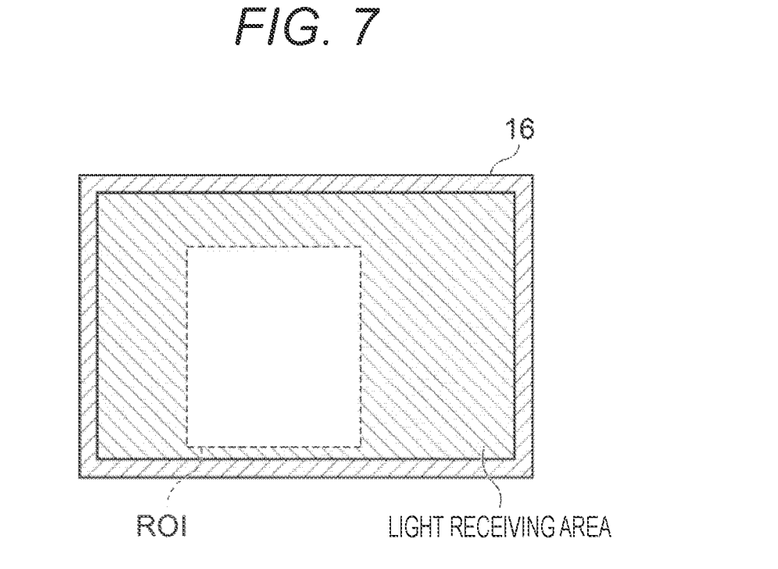
FIG. 7 is a diagram showing the appearance of the light receiving unit according to the embodiment.

FIG. 7 is a diagram showing the event detection standby state in S106. As shown in this FIG. 7, the event detection in event detecting pixels belonging to the light receiving area other than the ROI is put into a halting state. Meanwhile, the threshold for event detection in event detecting pixels belonging within the ROI is set to the second threshold that is a threshold smaller than the first threshold. By setting the threshold to the second threshold in this way, as described above, it becomes possible to detect an event that causes a lower-contrast luminance change than the first threshold is set.

Figure 8:
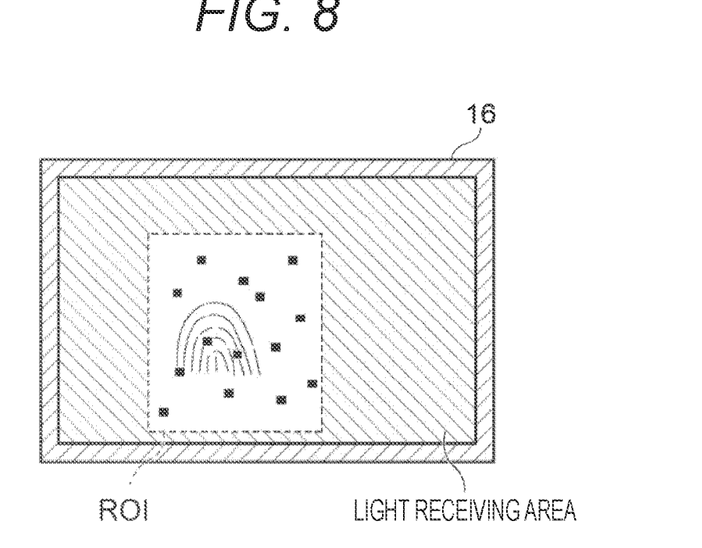
FIG. 8 is a diagram showing the appearance of the light receiving unit according to the embodiment.

FIG. 8 is a diagram showing an example in which an event has been detected with the second threshold. For example, along with fingerprint information, a noise event that depends on the low second threshold occurs.

Figure 9:
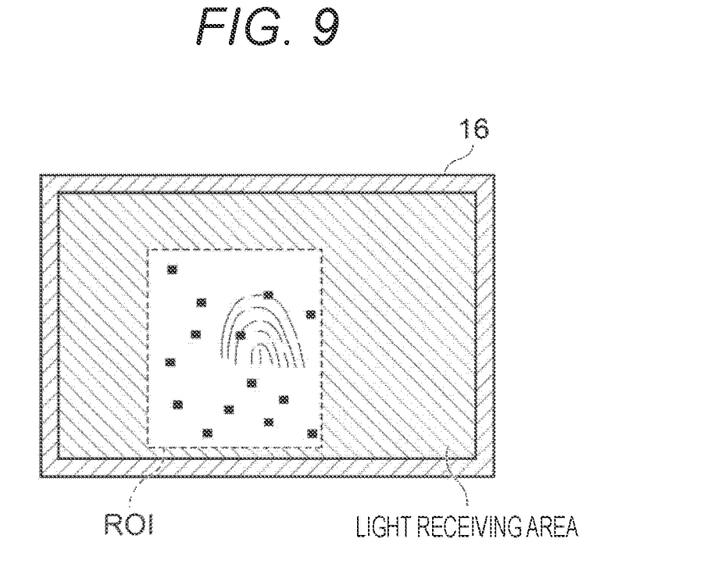
FIG. 9 is a diagram showing the appearance of the light receiving unit according to the embodiment.

FIG. 9 is a diagram showing an example in which an event acquired at a different time from that is in FIG. 8 has been detected. For example, in a case where the position of the finger is moving, a fingerprint-like event is detected at a different position from that is in FIG. 8, and a noise event occurs at a different position.

While tracking detected events, the signal processing unit 22 and/or the image processing unit 24 and integrate the events in the time direction. As a result, it is possible to suppress the influence of noise and appropriately acquire fingerprint information.

As described above, according to the present embodiment, it is possible to acquire information that the finger has been put on the cover glass 12 with the first threshold and set the ROI and the second threshold and acquire fingerprint information with noise suppressed. By using the two thresholds and setting the ROI in this way, it makes possible the fingerprint information using the event-driven pixels, and this authentication can be acquired regardless of a synchronization signal, and therefore it is possible to implement authentication on with high speed and low latency, and with high efficiency that can reduce calculation for denoising, etc. The thresholds are set at two stages, thereby it becomes possible to acquire fingerprint information or the like that is more tolerant to noise and more appropriately detects the occurrence of an event than in a case where the threshold for event detection is determined at one stage.

Furthermore, the event-driven pixels are used, thus it is possible to acquire information of the moving finger with less influence of motion blur, etc. That is, it is possible to authenticate the finger not with the finger at rest on the cover glass 12 for authentication but with the finger moving. Moreover, it is also possible to acquire image information as binarization information the basis of the characteristics of the event-driven pixels, and it is also possible to skip such binarization processing, etc.

It is noted that, in the above description, it is described as an authentication device including the authentication unit 26; however, may operate as solid-state imaging device not including the authentication unit 26. In this case, the solid-state image capturing device captures and acquires an image base on an appropriate area and an appropriate luminance change on the basis of the above-described respective operations. The acquired image may be stored, for example, in the storage unit 20, or may be output to the outside. In this way, it may be provided as an aspect of operating as a solid-state imaging device using event-driven pixels.

The above is the description of the authentication device 10 using the event-driven pixels; subsequently, some implementation examples of the optical system are described.

Figure 10:
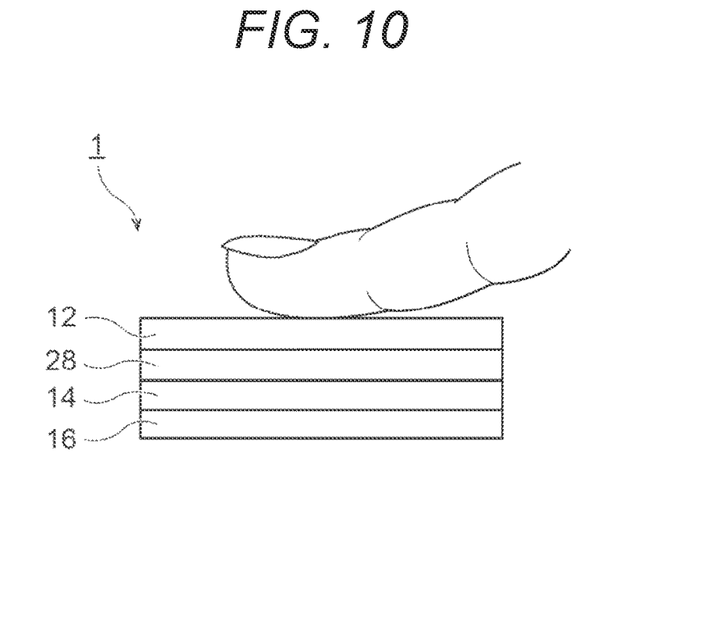
FIG. 10 is a diagram schematically showing an example of an electronic apparatus according to an embodiment.

FIG. 10 is a diagram showing an example of an electronic apparatus 1 in which the authentication device 10 is incorporated. The electronic apparatus 1 includes a light-emitting unit 28 besides the cover glass 12, the optical system 14, and the light receiving unit 16 as the authentication device 10.

The light-emitting unit 28 is provided, for example, between the cover glass 12 and the optical system 14. This light-emitting unit 28 may further include an optical system for light emission separately from the optical system 14. The cover glass 12 may be provided not only as one for light reception for acquisition of an authentication image, but may also function as one for light emission that appropriately outputs light emitted from a light-emitting element to the user. The light-emitting unit 28 may include, for example, a light-emitting element such as an organic light emitting diode (OLED) or a micro OLED. As shown in the drawing, the light receiving unit 16 may be provided farther than the light-emitting unit 28.

This light-emitting unit 28 serves as, for example, a display that outputs a projected image, an image, etc. In this case, the electronic apparatus 1 may be, for example, terminal devices such as a smartphone, tablet terminal, and a laptop computer. And, the authentication device 10 may output an authentication result for authentication or the like of access of these terminal devices.

In this way, according to an aspect described in the present disclosure, it is also possible to embed the authentication device 10 for a fingerprint or the like into displays of various mobile terminals and stationary terminals. In this case, the authentication can also be performed not with the finger immobilized on a predetermined point of the display but with the finger moving in a predetermined area. For example, with respect to a relatively fast motion such as a swipe, high-performance, high-speed, and low-latency authentication can be implemented by means of the event-driven pixels.

In the above respective forms, the optical system 14 may include, for example, a microlens array, a lens array, or the like. As another example, it may be configured in a form of including no lens, for example, including a pinhole or the like.

Figure 11:
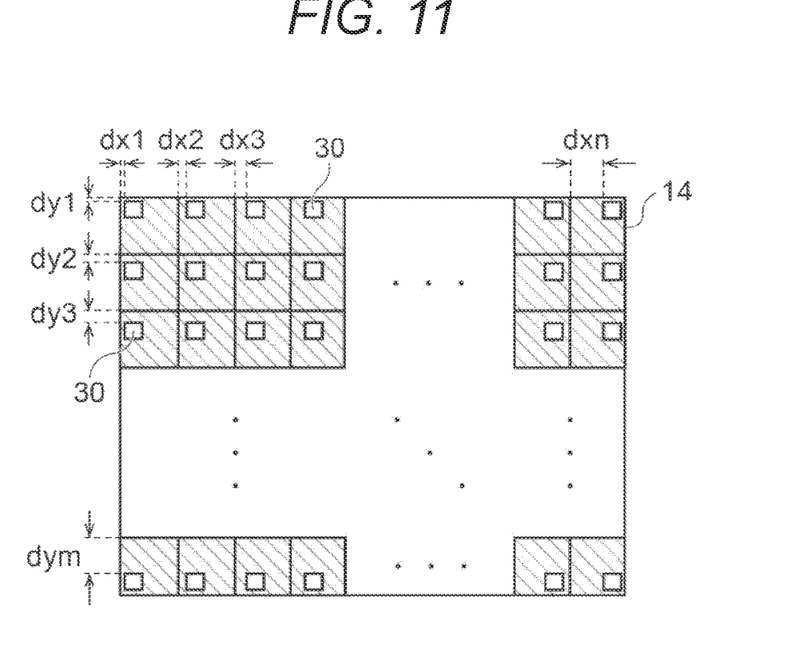
FIG. 11 is a diagram schematically showing an example of an optical system according to the embodiment.

FIG. 11 is a diagram showing an example in which the optical system 14 includes a pinhole. For example, n×m pinholes 30 (a pinhole array) may be provided as the optical system 14 on n×m event-driven pixels of the light receiving unit 16.

As shown in the drawing, the pinholes 30 are provided in positions at distances of (dx1, dy1), (dx2, dy2), . . . , and (dxn, dym) from respective end points of the pixels. As shown in FIG. 11, they may be arranged so as to meet, for example, dx1<dx2< . . . <dxn and dy1<dy2< . . . <<dym. By providing them in such an arrangement, it becomes possible to perform control so that light from the outside of the light receiving unit 16 is received.

The event-driven pixels have excellent performance in a dark place; therefore, it is possible to reduce the size of the pinholes 30. By reducing the size of the pinholes 30 in this way, it becomes possible to more accurately implement the adjustment of the light receiving areas according to the positions of the pinholes 30.

Figure 12:
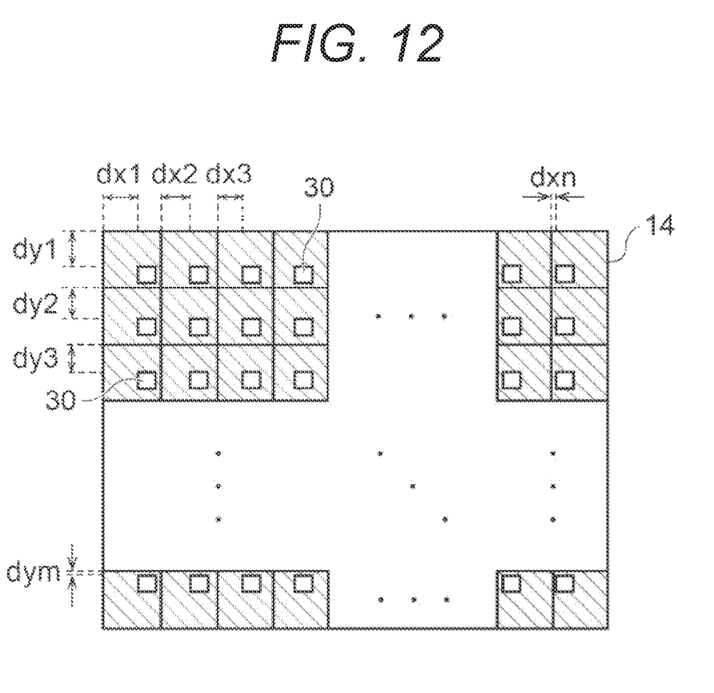
FIG. 12 is a diagram schematically showing the example of the optical system according to the embodiment.

FIG. 12 is a diagram showing pinhole positions different from those in FIG. 11. In FIG. 12, by having such a configuration having a configuration that meets dx1>dx2> . . . >dxn and dy1>dy2> . . . >dym, it becomes possible to acquire a more accurate fingerprint image in the middle of the light receiving unit 16.

Figure 13:
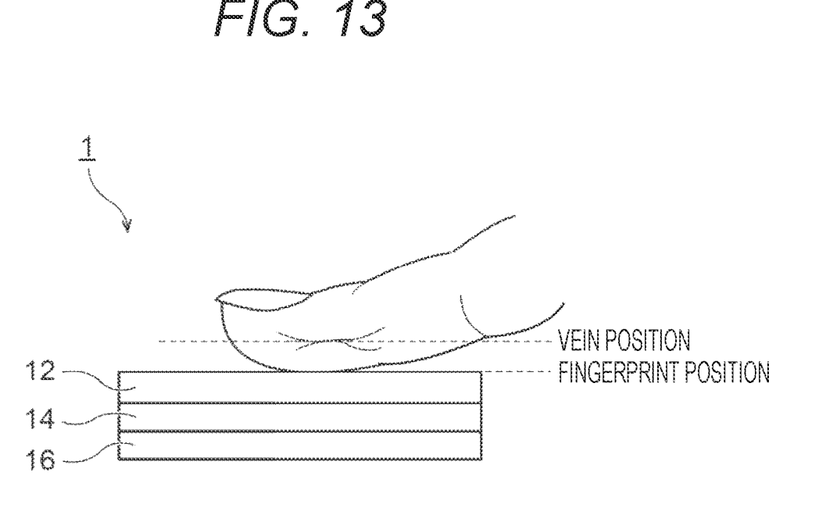
FIG. 13 is a diagram schematically showing an example of the electronic apparatus according to the embodiment.

FIG. 13 is a diagram showing an example of a position at which an image is to be captured by the electronic apparatus 1. As described above, the contents of the present disclosure are not limited to fingerprint authentication. For example, the authentication device 10 may implement the authentication according to the position of the finger vein. In a case of implementing such vein authentication, the positions of the pinholes shown in FIG. 11 or FIG. 12 described above may be set so that light reflected and scattered from the position of the vein is appropriately acquired in the event-driven pixels. For example, in a case where the vein is located 2 mm above the position of the fingerprint, the pinholes 30 may be provided so as to be in focus on a position 2 mm above the cover glass 12. As another example, a microlens array at brings it into focus on the position 2 mm above the cover glass 12 may be provided as the optical system 14. The distance of 2 mm is given as an example, and it is desirable to appropriately set the distance from the cover glass 12.

Figure 14:
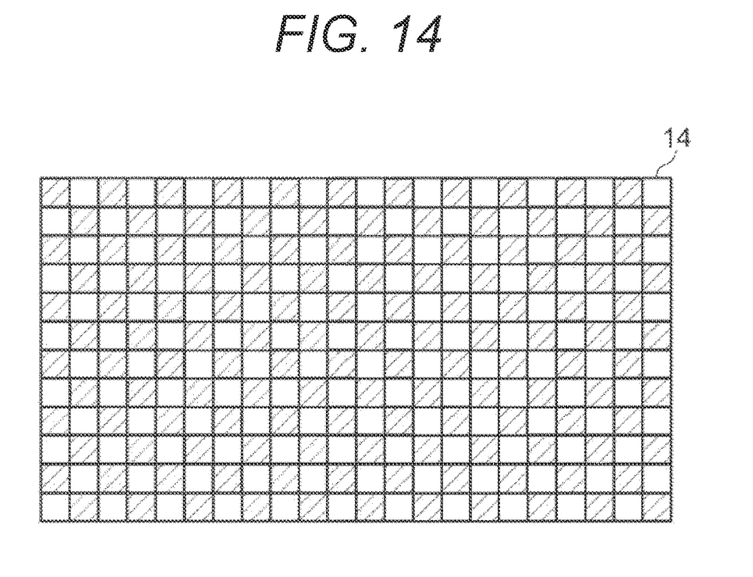
FIG. 14 is a diagram schematically showing an example of the optical system according to the embodiment.

FIG. 14 is a diagram showing still another example of the optical system 14. The light receiving unit 16 may include, for example, pixels that acquire a fingerprint image and pixels that acquire a vein image. In this case, the fingerprint image acquisition pixels and the vein image acquisition pixels may be alternately arranged in a checkered pattern.

And, as shown in FIG. 14, as the optical system 14, a pinhole that causes light reflected and scattered on the surface where the fingerprint exists to reach the event-driven pixel and a pinhole that causes light reflected and scattered on the surface where the vein exists to reach the event-driven pixel may be provided on each of the acquisition pixels. For example, portions indicated by oblique lines are pinholes corresponding to the vein image acquisition pixels, and portions indicated in white are pinholes corresponding to the fingerprint image acquisition pixels.

The arrangement of these pinholes may be those shown in FIGS. 11 and 12. In this case, with respect to the respective pixels corresponding to the vein image and the fingerprint image, pinholes may be provided at different array pitches (such as dx1 and dy1 in FIGS. 11 and 12). As with the above, this pinhole array may be configured to obtain the same effect of acquiring information of depth that differs according to the array.

The control unit 18 may set a second threshold of pixels for the fingerprint and a second threshold of pixels for the vein as different ones.

As described above, as for the optical system 14 and the light receiving unit 16, they may have various configurations. These are given as examples, and they are not limited to these configurations.

In all of the above-described forms, the event-driven pixels can detect a change in the luminance value of received light with high sensitivity based on the threshold. By this characteristic, as described above, with respect to a relatively fast motion such as a swipe, authentication can be appropriately performed.

In a case of detecting the vein, the first threshold and the second threshold may be determined so that the occurrence of an event can be detected from the blood flow. For example, in the case of the vein, the finger may be immobilized; in this case, to acquire a sufficiently small luminance change, with respect to the second threshold, the setting of a second-stage threshold may be performed with a second threshold smaller than the second threshold for fingerprint authentication.

(Implementation Example of Light Receiving Unit)

The light receiving unit used in the above-described embodiment is described with an example. It is noted that the form of the light receiving unit 16 is not limited to the present form, and it is only required to have a configuration in which a pixel detects an event and can appropriately acquire information regarding the coordinates of the pixel that has detected the event.

Figure 15:
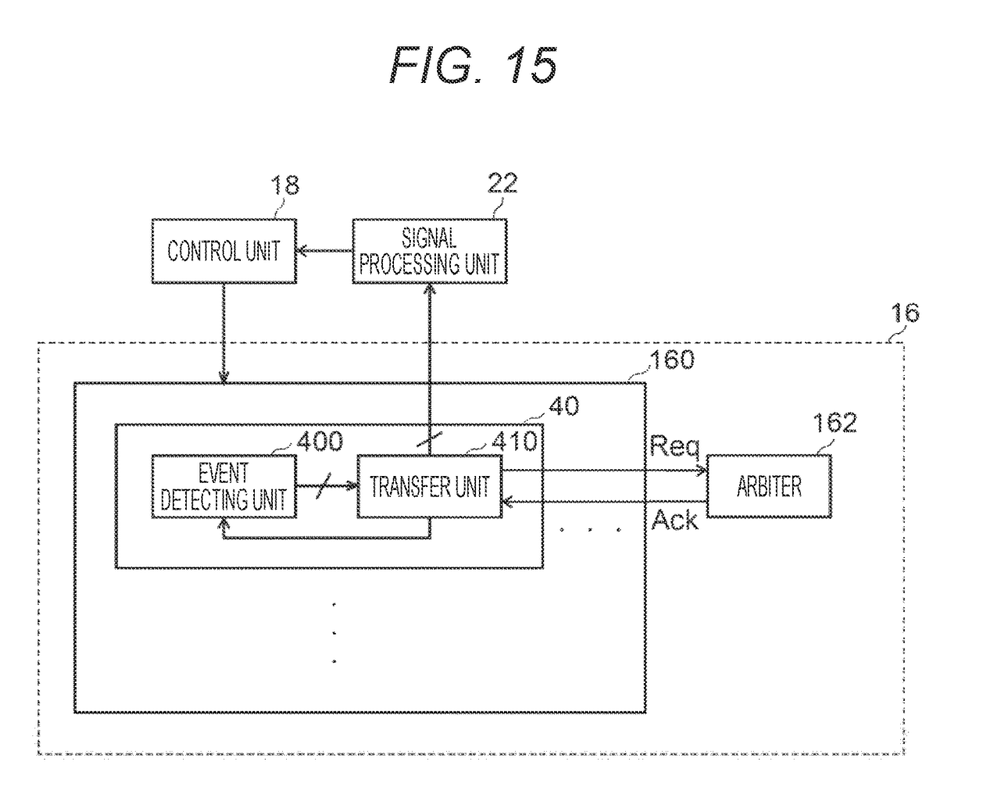
FIG. 15 is a diagram showing an example of a block diagram of the light receiving unit according to the embodiment.

FIG. 15 is a block diagram showing an example of a configuration of light receiving pixels of the light receiving unit 16. The light receiving unit 16 includes a light receiving pixel array 160 and an arbiter 162.

The light receiving pixel array 160 includes event-driven pixels 40 arranged in a plurality of arrays. The above-described information of the coordinates may be defined as the position of an event-driven pixel 40 within this light receiving pixel array 160.

When having received a request signal from each of the event-driven pixels 40 within the light receiving pixel array 160, the arbiter 162 sends an acknowledge signal back to the event-driven pixel 40. This arbiter 162 may include, for example, a plurality of arbiters along respective axes of the pixels in arrays. For example, in the drawing, an x arbiter corresponding to the coordinates of horizontal components and a y arbiter corresponding to the coordinates of vertical components may be included. In this case, the event-driven pixels 40 output, as a request signal, a signal indicating that an event has been detected to each of the arbiters through signal lines connecting between themselves and each of the arbiters.

The event-driven pixels 40 include an event detecting unit 400 and a transfer unit 410.

The event detecting unit 400 includes, for example, photoelectric conversion elements such as photodiodes. This photodiode may be, for example, a photodiode that can acquire the intensity of light regardless of an avalanche breakdown. The event detecting unit 400 operates as a luminance change detecting unit that detects how much the intensity (the luminance in an image) of the light received by each photoelectric conversion element has changed in each of the positive and negative on the basis of an output of the photoelectric conversion element.

The transfer unit 410 outputs a request signal to the arbiter 162 on the basis of an output of the event detecting unit 400. On the basis of this request signal, the arbiter 162 transmits an acknowledge signal to the transfer unit 410 of the corresponding event-driven pixel 40, and notifies of information transfer from the transfer unit 410 to the signal processing unit 22.

The transfer unit 410 that has received the acknowledge signal outputs data indicating its own coordinates, the time when an event has been detected, and the polarity of the event (whether a luminance change is positive or negative) to the signal processing unit 22. Along with this output to the signal processing unit 22, the transfer unit 410 outputs a signal to reset the light receiving element of the event detecting unit 400 to the event detecting unit 400.

In this way, when having detected an event in the event-driven pixel 40, the light receiving unit 16 outputs information of the coordinates of the pixel that has detected the event, the time, and the polarity of a luminance change to the signal processing unit 22. The processing after the output to the signal processing unit 22 is as described above.

Figure 16:
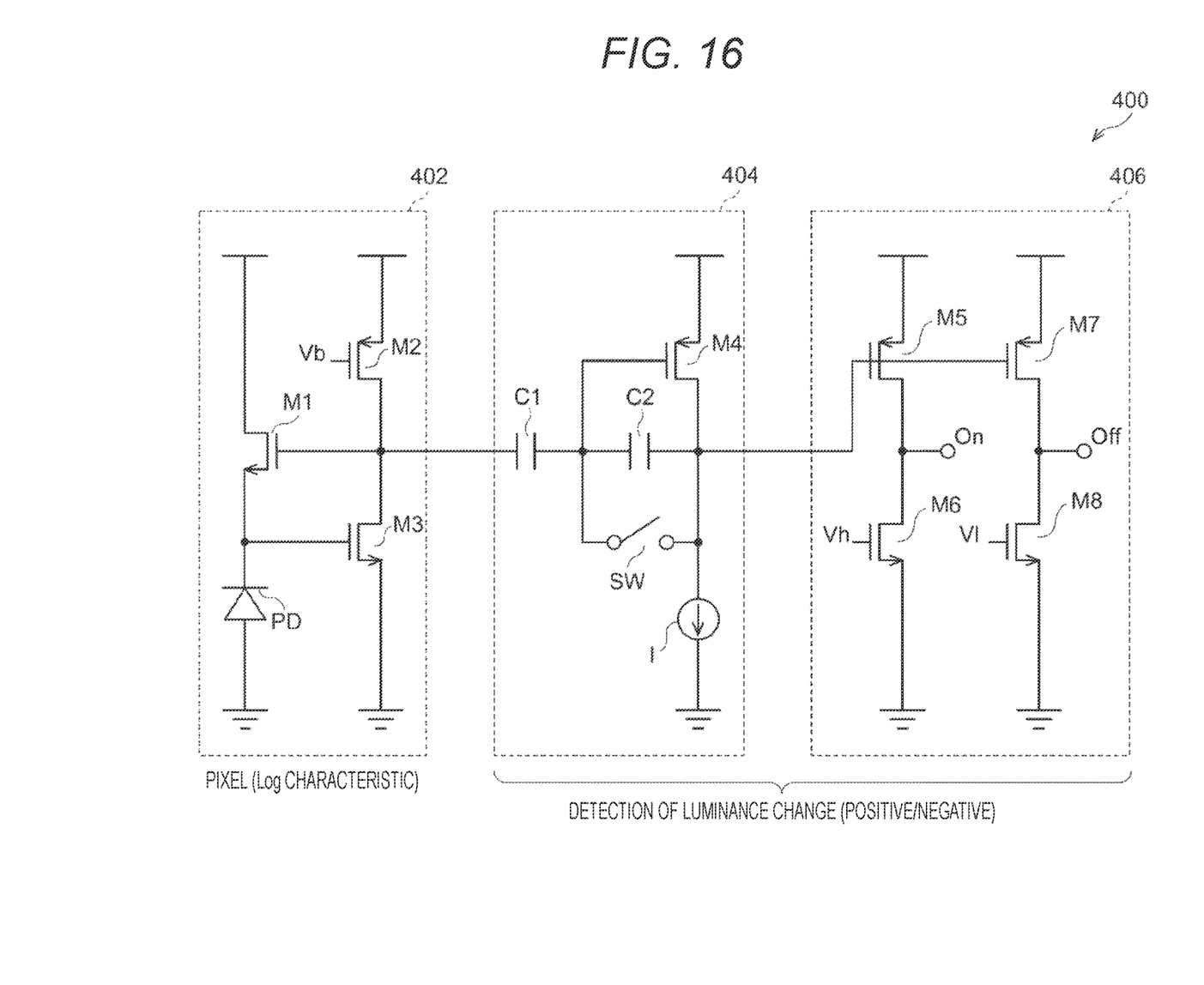
FIG. 16 is a circuit diagram showing a position example of a circuit of the light receiving unit according to the embodiment.

FIG. 16 is a circuit diagram showing an example of the event detecting unit 400. The event detecting unit 400 includes a logarithmic response output circuit 402, a difference voltage detection circuit 404, and a comparator 406. The logarithmic response output circuit 402 is provided as part of a so-called light receiving pixel, and converts a signal output from a light receiving element into a logarithm and outputs the logarithm. The difference voltage detection circuit 404 and the comparator 406 operate together as a luminance change detector. For example, on the basis of the signal output from the light receiving pixel, this luminance change detector outputs a luminance change of light received by the light receiving element that is equal to or more than a predetermined amount, together with the positive or negative polarity.

The logarithmic response output circuit 402 includes a photodiode PD that is a photoelectric conversion element and transistors M1, M2, and M3.

When light enters, the photodiode PD generates a current by photoelectric conversion and outputs the current. As described above, as a non-limiting example, this photodiode PD may be a photodiode that does not use an avalanche breakdown. An anode of the photodiode PD is grounded.

The transistors M1, M2, and M3 include a circuit that converts the current output from the photodiode PD into a logarithmically converted voltage.

The transistor M1 is, for example, an n-type MOSFET; a drain thereof is connected to a power supply voltage terminal, and a source thereof is connected to a cathode of the photodiode PD.

The transistor M2 is, for example, a p-type MOSFET; a source thereof is connected to the power supply voltage terminal, a drain thereof is connected to a gate of the transistor M1, and a predetermined bias voltage Vb is applied to a gate thereof.

The transistor M3 for example, an n-type MOSFET; has a drain thereof is connected to the drain the transistor M2, a source thereof is grounded, and a gate thereof is connected to the cathode of the photodiode PD.

The logarithmic response output circuit 402 outputs a voltage at a connection point between the drain of the transistor M2 and the drain of the transistor M3 to the difference voltage detection circuit 404. By controlling the bias voltage Vb, whether or not to output a signal of light received in the pixel can be controlled. The above-described setting of the ROI is implemented by the control unit 18 controlling the bias voltage Vb.

The difference voltage detection circuit 404 includes capacitors C1 and C2, a transistor M4, a switch SW, and a current source I. The difference voltage detection circuit 404 acquires a difference between an output the logarithmic response output circuit 402 and a reference voltage, and outputs the difference.

One of terminals of the capacitor C1 is connected to the output of the logarithmic response output circuit 402. One of terminals of the capacitor C2 is connected to the other terminal of the capacitor C1. The difference voltage detection circuit 404 outputs a voltage corresponding to the acquired difference from the reference voltage through the other terminal of the capacitor C2.

The transistor M4 is, for example, a p-type MOSFET; a source thereof is connected to the power supply voltage terminal, and a drain thereof is connected to the other terminal of the capacitor C2.

The current source I is connected to between the drain of the transistor M4 and a ground point, and causes a predetermined current to flow from the drain of the transistor M4 and the other terminal of the capacitor C2 to the ground point. In the above-described configuration, this transistor M4 and this current source I operate as a circuit that generates a turnover voltage based on a voltage applied to a gate of the transistor M4 and outputs the turnover voltage from the drain of the transistor M4.

A voltage corresponding to a difference of the voltage input to the difference voltage detection circuit 404 by the capacitor C1 from the reference voltage is applied to the gate of the transistor M4.

The switch SW is connected to the above-described transfer unit 410, and switches between on and off on the basis of a reset signal from the transfer unit 410. When the reset signal has been input, the switch SW is turned on to reset an electric charge stored in the capacitor C2. Through this reset operation, the output of the difference voltage detection circuit 404 is reset to an initial value. Thus, the reset signal is input from the transfer unit 410, thereby the event detecting unit 400 performs event detection from the timing at which the reset signal has been input on the basis of the luminance at the timing.

The comparator 406 includes transistors M1, M6, M7, and M8. Drive terminals of the transistors M5 and M6 are connected to the input of the comparator 406, and the comparator 406 performs an output from a connection point with the transistors M5 and M6 and a connection point with the transistors M7 and M8.

The transistor M5 is, for example, a p-type MOSFET; a gate thereof is connected to the output of the difference voltage detection circuit 404, and a source thereof is connected to the power supply voltage terminal.

The transistor M6 is, for example, an n-type MOSFET; a drain thereof is connected to a drain of the transistor M5, a source thereof is grounded, and a predetermined bias voltage Vh is applied to a gate thereof. As described above, the drains of the transistors M5 and M6 are connected to the transfer unit 410 and perform an output.

The predetermined bias voltage Vh is a voltage indicating a positive-side threshold. In a case where an output of the difference voltage detection circuit 404, i.e., a voltage corresponding to the amount of change in the intensity of light received per unit time is higher than Vh, a current is output from an On terminal.

The transistor M7 is, for example, a p-type MOSFET; a gate thereof is connected to the output of the difference voltage detection circuit 404, and a source thereof is connected to the power supply voltage terminal.

The transistor M8 for example, an n-type MOSFET; a drain thereof is connected to a drain of the transistor M7, a source thereof is grounded, and a predetermined bias voltage Vl is applied to a gate thereof. As described above, the drains of the transistors M7 and M8 are connected to the transfer unit 410 and perform an output.

The predetermined bias voltage Vl is a voltage indicating a negative-side threshold. In a case where an output of the difference voltage detection circuit 404, i.e., a voltage corresponding to the amount of change in the intensity of light received per unit time is lower than Vl, a current is output from an Off terminal.

In this way, in a case where voltages with Vh and Vl as thresholds are applied, the comparator 406 outputs currents corresponding to the voltages.

In the above-described embodiment, in a case where the threshold voltage is changed, it can be implemented by the control unit 18 controlling the bias voltage.

The embodiment described above may have the following forms.

(1)
A solid-state imaging device including:
a light receiving unit including event-driven pixels that output the occurrence of an event on the basis of a threshold; and
a control unit that controls the light receiving unit, the control unit configured to
set a first threshold for the event-driven pixels, and
in a case where an event based on the first threshold has been detected, set a second threshold smaller than the first threshold for the event-driven pixels.

(2)
The solid-state imaging device according to (1), in which
in the case where an event based on the first threshold has been detected, the control unit further sets a region of interest (ROI) in the light receiving unit, the event-driven pixels detecting an event in the ROI.

(3)
The solid-state imaging device according to (1) or (2), further including
a signal processing unit configured to process signals that the event-driven pixels have output.

(4)
The solid-state imaging device according to (3), in which
the signal processing unit generates an authentication image by time-integrating the signals that the event-driven pixels have output.

(5)
The solid-state imaging device according to (4), further including
an authentication unit configured to perform authentication using the authentication image based on the signals that the event-driven pixels have output.

(6)
The solid-state imaging device according to (4), in which
the authentication image is a fingerprint image.

(7)
The solid-state imaging device according to (4), in which
the authentication image is a vein image.

(8)
The solid-state imaging device according to (1) to (7), further including
an optical system configured to cause each of the event-driven pixels belonging to the light receiving unit to receive light.

(9)
The solid-state imaging device according to (8), in which
the optical system includes a pinhole array.

(10)
The solid-state imaging device according to (8), in which
the optical system includes a microlens array.

(11)
The solid-state imaging device according to (9) or (10), in which
an authentication image is a fingerprint image and a vein image, and
the event-driven pixels include pixels that acquire the fingerprint image and pixels that acquire the vein image.

(12)
The solid-state imaging device according to (11), in which
the pixels include pixels that acquire the fingerprint image and the pixels that acquire the vein image are arranged in a checkered pattern.

(13)
The solid-state imaging device according to (12), in which
the optical system adjusts a focal position for the pixels that acquire the fingerprint image and a focal position for the pixels that acquire the vein image to be different positions.

(14)
An electronic apparatus including
the solid-state imaging device according to any of (1) to (13).

(15)
The electronic apparatus according to (14), further including a light-emitting unit configured to output a projected image,
in which the light receiving unit is provided farther than the light-emitting unit with respect to an object.

Aspects of the present disclosure are not limited to the above-described embodiments, but include various conceivable modifications, and the effects of the present disclosure are not limited to the contents described above. The components in the respective embodiments may be appropriately combined and applied. That is, various additions, alterations, and partial deletions can be made without departing from the conceptual idea and meaning of the present disclosure derived from the contents defined in the claims and equivalents thereof.

REFERENCE SIGNS LIST

1 Electronic apparatus
2 Solid-state imaging device
10 Authentication device
12 Cover glass
14 Optical system
16 Light receiving unit
18 Control unit
20 Storage unit
22 Signal processing unit
24 Image processing unit
26 Authentication unit
28 Light-emitting unit
30 Pinhole
40 Event-driven pixel
400 Event detecting unit
410 Transfer unit
402 Logarithmic response output circuit
404 Difference voltage detection circuit
406 Comparator
M1, M2, M3, M4, M5, M6, M7, M8 Transistor
PD Photodiode
C1, C2 Capacitor
SW Switch
I Current source

The invention claimed is:
1. A solid-state imaging device comprising:
a light receiving unit including event-driven pixels that output occurrence of an event on a basis of a threshold; and
a control unit that controls the light receiving unit, the control unit configured to
set a first threshold for the event-driven pixels, and
in a case where an event based on the first threshold has been detected, set a second threshold smaller that the first threshold for the event-driven pixels.
2. The solid-state imaging device according to claim 1, wherein
in the case where an event based on the first threshold has been detected, the control unit further sets a region of interest (ROI) in the light receiving unit, the event-driven pixels detecting an event in the ROI.

3. The solid-state imaging device according to claim 1, further comprising
a signal processing unit configured to process signals that the event-driven pixels have output.

4. The solid-state imaging device according to claim 3, wherein
the signal processing unit generates an authentication image by time-integrating the signals that the event-driven pixels have output.

5. The solid-state imaging device according to claim 4, further comprising
an authentication unit configured to perform authentication using the authentication image.

6. The solid-state imaging device according to claim 4, wherein
the authentication image is a fingerprint image.

7. The solid-state imaging device according to claim 4, wherein
the authentication image is a vein image.

8. The solid-state imaging device according to claim 1, further comprising
an optical system configured to cause each of the event-driven pixels belonging to the light receiving unit to receive light.

9. The solid-state imaging device according to claim 8, wherein
the optical system includes a pinhole array.

10. The solid-state imaging device according to claim 9, wherein
an authentication image into which signals that the event-driven pixels have output are time-integrated is a fingerprint image and a vein image, and
the event-driven pixels include pixels that acquire the fingerprint image and pixels that acquire the vein image.

11. The solid-state imaging device according to claim 10, wherein the pixels include pixels that acquire the fingerprint image and the pixels that acquire the vein image are arranged in a checkered pattern.

12. The solid-state imaging device according to claim 11, wherein
the optical system adjusts a focal position for the pixels that acquire the fingerprint image and a focal position for the pixels that acquire the vein image to be different positions.

13. The solid-state imaging device according to claim 8, wherein
the optical system includes a microlens array.

14. An electronic apparatus comprising
the solid-state imaging device according to claim 1.

15. The electronic apparatus according to claim 14, further comprising a light-emitting unit configured to output a projected image,
wherein the light receiving unit is provided farther than the light-emitting unit with respect to an object.

* * * * *